United States Patent [19]
Wells

[11] Patent Number: 5,087,178
[45] Date of Patent: Feb. 11, 1992

[54] OIL FLOODED SCREW COMPRESSOR SYSTEM WITH MOISTURE SEPARATION AND HEATED AIR DRYER REGENERATION, AND METHOD

[75] Inventor: Lyle G. Wells, Milwaukie, Oreg.

[73] Assignee: Rogers Machinery Company, Inc., Portland, Oreg.

[21] Appl. No.: 765,451

[22] Filed: Sep. 24, 1991

Related U.S. Application Data

[63] Continuation of Ser. No. 460,733, Jan. 4, 1990, abandoned.

[51] Int. Cl.$^5$ ............................ F04C 29/04; B01D 53/04
[52] U.S. Cl. ........................................ 418/1; 418/85; 418/100; 418/DIG. 1; 55/33
[58] Field of Search ................ 418/83, 85, 88, 97, 418/99, 100, DIG. 1, 1; 55/32, 33

[56] References Cited

U.S. PATENT DOCUMENTS

| | | | |
|---|---|---|---|
| 2,470,655 | 5/1949 | Shaw | 418/85 |
| 3,785,755 | 1/1974 | Novak | 418/85 |
| 4,322,223 | 3/1982 | Christel | 55/33 |

FOREIGN PATENT DOCUMENTS 186776  7/1986  European Pat. Off. ............ 418/85

Primary Examiner—Richard A. Bertsch
Assistant Examiner—David L. Cavanaugh
Attorney, Agent, or Firm—Eugene M. Eckelman

[57] ABSTRACT

Air and oil from an oil flooded screw compressor is directed through an air-oil separator. The air is cooled to extract moisture therefrom. Then the cooled air is fed to a drying tower and from the tower the air, together with hot oil from the air-oil separator, is fed to a heat exchanger which heats the air to a desired temperature for use and cools the oil to a desired temperature for re-use by the compressor. The regenerating portion of the tower communicates with the outlet of the heat exchanger for supplying dry heated air as purge air for efficient regeneration.

7 Claims, 1 Drawing Sheet

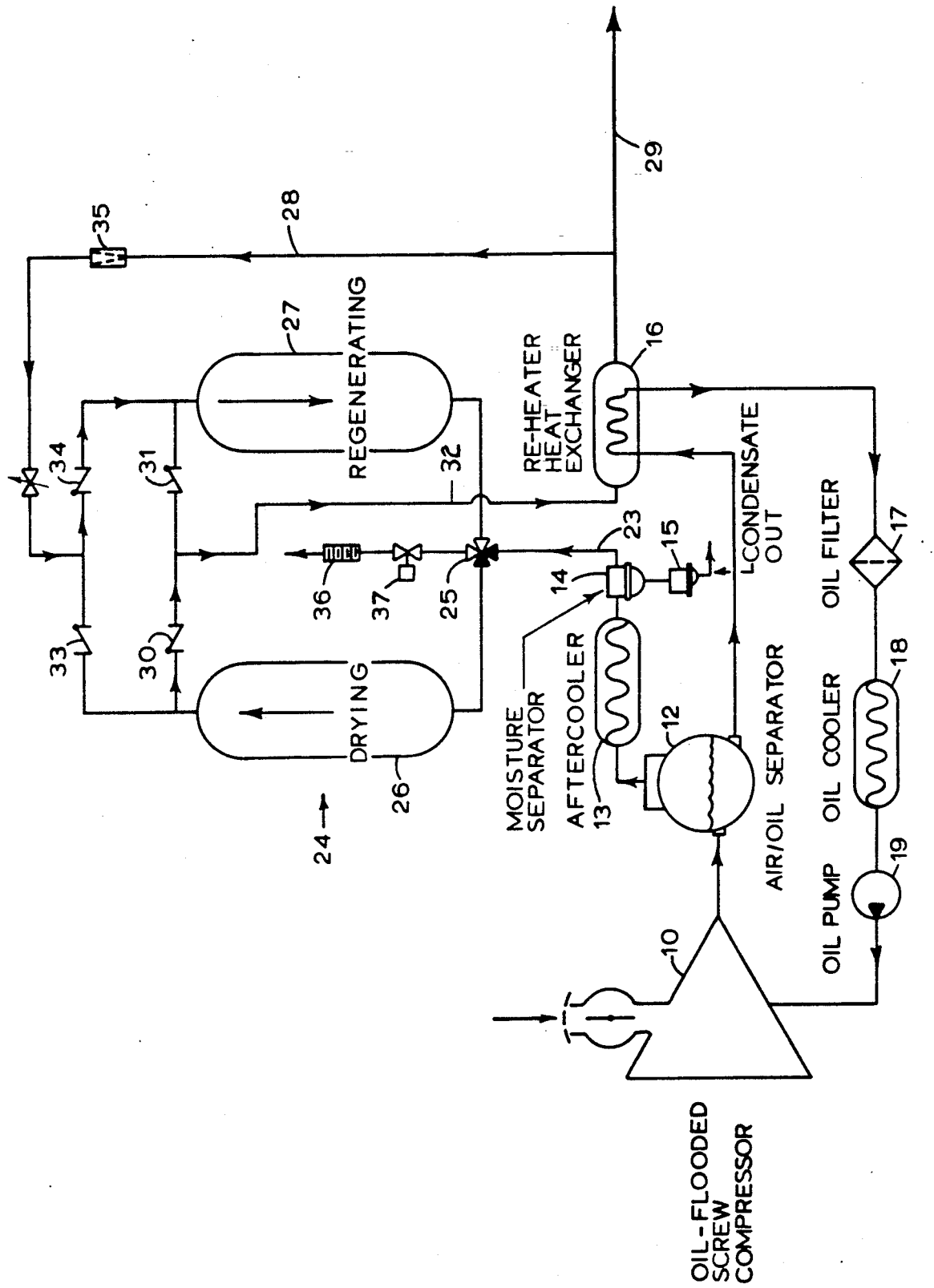

OIL FLOODED SCREW COMPRESSOR SYSTEM WITH MOISTURE SEPARATION AND HEATED AIR DRYER REGENERATION, AND METHOD

This application is a continuation of application Ser. No. 07/460,733, filed Jan. 4, 1990, abandoned.

BACKGROUND OF THE INVENTION

This invention relates to new and useful improvements in air-oil flooded screw compressor systems, and method.

In U.S. Pat. No. 3,785,755, an oil flooded screw compressor system separates the air and oil and then cools the air to extract moisture therefrom. The cooled air and hot oil are then passed through a heat exchanger which heats the air for use and cools the oil to a desired temperature for recirculation through the compressor. The output air is discharged from the heat exchanger at about 160 degrees F., at about 100 psi, and at about 25 percent relative humidity. In general, users of compressed air prefer the air to be substantially moisture free. For this purpose, drying and regenerating towers are employed in the above and other systems through which the output air is directed. Since a portion of the output air is used to regenerate its dryers, the moisture laden condition of these prior systems requires them to use approximately 15% percent of the output energy for purging. The purging energy is of course lost as far as ultimate use is concerned, and it is desired that this loss of energy be kept as low as possible.

SUMMARY OF THE INVENTION

A general object of the invention is to provide a novel compressor system that uses reheater principles of U.S. Pat. No. 3,785,755 in combination with a drying and regenerating tower but in an arrangement that greatly increases the efficiency of the tower with relation to conventional drying and regenerating towers, this new system decreasing the energy requirements for operating the dryer, and thereby reducing the overall compressed air requirement of the system. Economic benefits are derived from the down sizing of the compressor and the resulting reduction of initial cost and operating costs.

A more particular object is to provide a system that uses heated air from an oil-air heat exchanger within the system to purge a drying and regenerating tower.

In carrying out the objects of the invention, the hot oil and air from an oil flooded screw compressor is directed through air-oil separator means. The air from the outlet of the air-oil separator means is directed into aftercooler means and the outlet of the aftercooler then directs the air to moisture separator means for removing moisture from the cooled compressed air. Thereupon, the cooled air is fed to a drying tower having at least two dryer means arranged to dry air to substantially a moisture free condition. The tower has switching means arranged to alternately operate and regenerate the two dryer means. Reheater heat exchanger means, having an outlet of the compressed air for power use, receives dry air from the tower and also receives oil from the air-oil separating means whereby the dry air is reheated for power use and the oil is cooled for return to the compressor. The outlet of the reheater heat exchanger means which leads to power use has a branch line communicating, through the switching means, with the dryer means being regenerated for supplying dry heated air as purge air whereby to increase the regenerating efficiency and thus to minimize the overall energy requirements for operating the compressor.

The invention will be better understood and additional objects and advantages will become apparent from the following description taken in connection with the accompanying drawing.

BRIEF DESCRIPTION OF THE DRAWINGS

The single FIGURE of the drawing is a schematic view of a compressor system and drying and regenerating tower utilizing principles of the invention.

DETAILED DESCRIPTION OF A PREFERRED EMBODIMENT

In U.S. Pat. No. 3,785,755, and as also shown in part herein, compressed air and oil from an oil-flooded compressor 10 is directed at an elevated temperature of approximately 180 degrees F. through a conventional air-oil separator 12 at typical temperatures and pressures from the compressor at about the said 180 degrees F. and about 100 psi, respectively. The air is then fed to an aftercooler 13 where its temperature is reduced below the dew point. Water condensate is separated within a suitable conventional moisture separator 14 and withdrawn through a drain trap 15. Such air is cooled to approximately 70 degrees F. and remains saturated at 100 percent relative humidity. In U.S. Pat. No. 3,785,755, the cooled air from the outlet of aftercooler 14 is fed to a reheater heat exchanger 16. In this former system, the heat exchanger 16 also receives the hot oil from oil separator 12 for an exchange of heat, namely, the compressed air being heated to a temperature of approximately 160 degrees F. for use and the oil being cooled to a temperature desired for reuse in the compressor. The oil from the heat exchanger 16 passes through a filter 17, an oil cooler 18 and a pump 19.

The air out of the prior system was at 160 degrees F. and 8 percent relative humidity. This air must be run through a drying system to dry it and reduce the level of relative humidity. Thus, drying towers are used to remove this moisture.

In the present system, similar elements of air-oil separator 12, aftercooler 13, moisture separator 14, and drain trap 15 are used. However, the output 23 from moisture separator 14 is connected into the tower 24 rather than to the heat exchanger 16, whereby the air is dried prior to being fed to the heat exchanger 16.

Such tower includes a 4-way switching valve 25 for the flow control of incoming air at approximately 70 degrees F. and 100 percent relative humidity to one or the other of drying chambers 26 and 27 or the flow of regenerating air to the other of these chambers from a branch or purge line 28 leading off of output line 29 from the heat exchanger 16. The tower includes suitable check valves 30 and 31 in an output line 32 from the dryers which leads selectively from the dryers and check valves 33 and 34 in purge line 28 controlled for selected alternate operation of the tower in a conventional manner. Check valves 33 and 34 on the drying side remain closed by high pressure when purging on the regenerating side. Purge line 28 has a flow meter 35 therein. The switching valve 25 has a connection to an outlet line 36 to atmosphere controlled by a solenoid valve 37. By this tower structure and as well known, alternate drying and regenerating of chambers 26 and 27 are accomplished.

Heat exchanger 16 serves the same function as in the mentioned patent, namely, to provide an exchange of heat to heat the air to a temperature desired for use and to cool the oil to a temperature desired for re-use in the compressor.

The hot output air from heat exchanger 16 is at approximately original pressure, namely, 100 psi. Its temperature is approximately 160 degrees F. The relative humidity is now 0.04 percent or less. This dry air flowing through line 28 efficiently regenerates the drying chambers and requires only approximately 8 percent of the output of the air compressor, whereas previous systems using moisture laden purge air have output air at a much greater relative humidity and consequently require 15 percent or more of the output of the air compressor to regenerate. Thus, the requirements of the compressors using the dry regenerative air are less, and smaller equipment is capable of accomplishing an equivalent degree of output of larger equipment using moisture laden air.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An air compressor system comprising:
   an oil flooded screw compressor having an air inlet and an air and oil outlet for compressing air whereby the oil is heated,
   air-oil separator means having an inlet connected to the air and oil outlet of said compressor and also having an oil outlet and an air outlet for separating oil from the compressed air,
   aftercooler means having an outlet and an inlet connected to the air outlet of said separator means for cooling the compressed air,
   moisture separator means having an outlet and an inlet connected to the outlet of said aftercooler means for removing moisture from the compressed air that has been cooled,
   a drying and regenerating tower having an outlet and an inlet connected to the outlet of said moisture separator means and being arranged to dry the air to substantially a moisture free condition,
   reheater heat exchange means connected to the outlet of said drying and regenerating tower and to the outlet of said oil outlet of said air-oil separating means whereby to reheat the dry air and cool the heated oil,
   pump means for pumping oil from said separator means through the reheater heat exchanger to the compressor,
   said reheater heat exchanger means having an outlet of heated, dry air for compressed use,
   and means communicating with the outlet of said reheater heat exchanger means supplying dry heated air as purge air to said drying and regenerating tower.

2. The air compressor system of claim 1 wherein said drying and regenerating tower includes a pair of dryers and switching means therebetween providing alternate communication of said pair of dryers with the outlet of said aftercooler means for drying said cooled air with the outlet of said reheater heat exchanger means for regenerating.

3. The air compressor system of claim 1 wherein said aftercooler means cools said air from its heated outlet from the compressor to approximately 70 degrees F. at 100 percent relative humidity and said drying and regenerating tower and reheater heat exchanger means dries said air to approximately 0.04 percent relative humidity and heats it to approximately 160 degrees F.

4. The air compressor system of claim 1 wherein said purge air comprises a maximum of about 8 percent of the standard cubic feet of air output of said air compressor system.

5. A method of producing compressed air comprising:
   compressing moisture laden air in an oil flooded screw compressor whereby the air and oil are heated to an elevated temperature,
   separating the heated oil from the heated air,
   cooling the heated air to a degree substantially less than said elevated temperature,
   drying the air after said cooling step in a drying and regenerating tower,
   passing the dry air from said tower and the separated, heated oil through a reheater heat exchanger that reheats the air and cools the oil,
   returning the cooled oil to the compressor,
   and using a portion of an output of dry air from said heat exchanger as purge air for regenerating a dryer.

6. The method of claim 1 wherein the step of drying the air comprises first separating the water condensate therefrom wherein the cooled air has approximately 100 percent relative humidity at 70 degrees F. and then directing said air to said drying and regenerating tower for removing substantially all the moisture.

7. The method of claim 5 wherein the step of drying the air comprises first separating the water condensate therefrom wherein the cooled air has approximately 100 percent relative humidity at 70 degrees F. and then directing said air to a drying chamber for drying the air to approximately 0.04 percent relative humidity.

* * * * *